(12) United States Patent
Sundaresan et al.

(10) Patent No.: US 8,275,419 B2
(45) Date of Patent: Sep. 25, 2012

(54) ADVERTISEMENTS ON MOBILE DEVICES USING INTEGRATIONS WITH MOBILE APPLICATIONS

(75) Inventors: Subash Sundaresan, Fremont, CA (US); Ramesh Sarukkai, Union City, CA (US); Sam P. Hamilton, Los Altos, CA (US); Julie Wan-Chi Cheng, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 698 days.

(21) Appl. No.: 11/939,685

(22) Filed: Nov. 14, 2007

(65) Prior Publication Data

US 2009/0125376 A1    May 14, 2009

(51) Int. Cl.
*H04B 1/38* (2006.01)
(52) U.S. Cl. ........................................ 455/566; 455/466
(58) Field of Classification Search ................ 455/414.3
See application file for complete search history.

(56) References Cited

U.S. PATENT DOCUMENTS

| | | | |
|---|---|---|---|
| 6,009,409 A | 12/1999 | Adler et al. | 705/14 |
| 6,026,368 A | 2/2000 | Brown et al. | 705/14 |
| 6,199,045 B1 | 3/2001 | Giniger et al. | 705/1 |
| 6,343,317 B1 | 1/2002 | Glorikian | 709/217 |
| 6,377,793 B1 | 4/2002 | Jenkins | 455/456 |
| 6,401,075 B1 | 6/2002 | Mason et al. | 705/14 |
| 6,480,713 B2 | 11/2002 | Jenkins | 455/456 |
| 6,654,725 B1 | 11/2003 | Langheinrich et al. | 705/14 |
| 6,681,107 B2 | 1/2004 | Jenkins et al. | 455/412.1 |
| 6,714,975 B1 | 3/2004 | Aggarwal et al. | 709/224 |
| 6,826,572 B2 | 11/2004 | Colace et al. | 707/10 |
| 6,907,566 B1 | 6/2005 | McElfresh et al. | 715/517 |
| 6,928,615 B1 | 8/2005 | Haitsuka et al. | |
| 6,985,742 B1 | 1/2006 | Giniger et al. | 455/414.3 |
| 7,043,483 B2 | 5/2006 | Colace et al. | 707/3 |
| 7,177,429 B2 * | 2/2007 | Moskowitz et al. | 380/252 |
| 7,363,024 B2 | 4/2008 | Jenkins | 455/412.1 |
| 7,613,691 B2 * | 11/2009 | Finch | 1/1 |

(Continued)

FOREIGN PATENT DOCUMENTS

JP    2007-188150 A    7/2007

(Continued)

OTHER PUBLICATIONS

"CTIA: Smaato Introduces New Mobile Ad Solutions for Carriers: Advertising Delivery Support for Java Phones, Smartphones & Mobile Web; Launch of New Version of SOMA Mobile Advertising Platform," CTIA—San Francisco Moscone Center, Booth # 108, Oct. 23-25, 2007. Retrieved from http://www.smaato.com/download/pressarea/Smaato_CTIA_20071022_release.pdf.

(Continued)

*Primary Examiner* — Kwasi Karikari
(74) *Attorney, Agent, or Firm* — Nathan O. Greene; Brinks Hofer Gilson & Lione

(57) ABSTRACT

A method for delivering advertisements to mobile devices includes integrating an ad position within an application executable from a mobile device, wherein the ad position remains substantially constant in a location on a screen of the mobile device as viewed by a user throughout use of the application; including an ad call associated with the ad position; in response to executing the application, causing the ad call to retrieve an advertisement from an ad server; and receiving the advertisement into the ad position by the mobile device for display to the user.

17 Claims, 4 Drawing Sheets

U.S. PATENT DOCUMENTS

| | | | |
|---|---|---|---|
| 7,707,605 B2 * | 4/2010 | Yamada et al. | 725/48 |
| 2002/0046259 A1 | 4/2002 | Glorikian | 709/203 |
| 2002/0073034 A1 | 6/2002 | Wagner et al. | 705/51 |
| 2002/0078101 A1 | 6/2002 | Chang et al. | 707/516 |
| 2003/0013483 A1 * | 1/2003 | Ausems et al. | 455/556 |
| 2003/0046161 A1 | 3/2003 | Kamangar et al. | 705/14 |
| 2003/0149938 A1 | 8/2003 | McElfresh et al. | 715/517 |
| 2004/0039733 A1 | 2/2004 | Soulanille | 707/3 |
| 2004/0054576 A1 | 3/2004 | Kanerva et al. | 709/206 |
| 2004/0093327 A1 | 5/2004 | Anderson et al. | 707/1 |
| 2004/0137416 A1 | 7/2004 | Ma et al. | |
| 2004/0186776 A1 | 9/2004 | Llach | 709/200 |
| 2005/0010477 A1 | 1/2005 | Sullivan et al. | 705/10 |
| 2005/0154746 A1 | 7/2005 | Liu et al. | 707/5 |
| 2005/0174975 A1 | 8/2005 | Mgrdechian et al. | 370/338 |
| 2006/0085419 A1 | 4/2006 | Rosen et al. | 705/1 |
| 2006/0149630 A1 | 7/2006 | Elliott et al. | |
| 2006/0172697 A1 | 8/2006 | Gallego et al. | |
| 2006/0194572 A1 | 8/2006 | Fresonke et al. | 455/414.1 |
| 2006/0194595 A1 | 8/2006 | Myllynen et al. | 455/412.2 |
| 2007/0088801 A1 * | 4/2007 | Levkovitz et al. | 709/217 |
| 2007/0174490 A1 * | 7/2007 | Choi et al. | 709/246 |
| 2007/0178889 A1 * | 8/2007 | Cortegiano et al. | 455/414.3 |
| 2007/0180147 A1 | 8/2007 | Leigh | |
| 2008/0195457 A1 * | 8/2008 | Sherman et al. | 705/10 |

FOREIGN PATENT DOCUMENTS

| | | | |
|---|---|---|---|
| KR | 10-2007-0022444 A | 2/2007 | |

OTHER PUBLICATIONS

"Strong Partners for Effective Mobile Advertising: Adconion Media Group and Smaato Enter Strategic Partnership," San Mateo / Munich, Germany—May 9, 2007. Retrieved from http://www.smaato.com/download/pressarea/Smaato_AMD_20070503_release.pdf.

Smaato—Media / Developers. Retrieved on Jan. 3, 2008 from http://www.smaato.com/mo_mediadev.php.

Smaato—Mobile Carriers. Retrieved on Jan. 3, 2008 from http://www.smaato.com/mo_carriers.php.

Smaato—Mobile Marketing. Retrieved on Jan. 3, 2008 from http://www.smaato.com/mobile.php.

International Preliminary Report on Patentability, Application No. PCT/US2008/081445, dated May 18, 2010 (7 pages).

International Search Report from corresponding International Application No. PCT/US2008/081445, dated May 29, 2009 (13 pages).

"ESME," *Wikipedia, the free encyclopedia*, p. 1, http://en.wikipedia.org/wiki/ESME, last modified Dec. 20, 2006, last visited Oct. 9, 2007.

"Network Switching Subsystem," *Wikipedia, the free encyclopedia*, pp. 1-6, http://en.wikipedia.org/wiki/Network_Switching_Subsystem, last modified Oct. 9, 2007, last visited Oct. 9, 2007.

"Short message service," *Wikipedia, the free encyclopedia*, pp. 1-5, http://en.wikipedia.org/wiki/Short_message_service, last modified Oct. 9, 2007, last visited Oct. 9, 2007.

"Short message service center," *Wikipedia, the free encyclopedia*, pp. 1-2, http://en.wikipedia.org/wiki/Short_message_service_center, last modified Sep. 11, 2007, last visited Oct. 9, 2007.

"Signal Transfer Point," *Wikipedia, the free encyclopedia*, p. 1, http://en.wikipedia.org/wiki/Signal_transfer_point, last modified Aug. 16, 2007, last visited Oct. 9, 2007.

"My First 6 Yahoo Panama 'Enhancement' Requests [Archive]", *Search Engine Watch Forums*, pp. 1-2, http://forums.searchenginewatch.com/archive/index.php/t-15882.html, containing posts from Jan. 18, 2007 to Jan. 25, 2007, last visited Apr. 23, 2008.

"Limbo Offers Purina Pet Lodown," *Adweek*, pp. 1-2, http://www.adweek.com/aw/iq_interactive/article_display.jsp?vnu_content_id=1003665626, dated Oct. 31, 2007, last visited Apr. 1, 2008.

* cited by examiner

ADVERTISEMENTS ON MOBILE DEVICES USING INTEGRATIONS WITH MOBILE APPLICATIONS

BACKGROUND

1. Technical Field

The disclosed embodiments relate to advertisements (ads) on mobile devices, and more particularly, to ads served to mobile devices using integrations of ad position within applications through which the ads are displayed.

2. Related Art

Advertising on the internet has been historically tied to content. Advertisements ("ads") are displayed on specific web pages. Monetization of those ads typically involves and benefits the publisher of content displayed as part of a web page on a mobile device. This model has worked well on the personal computer because there is adequate real-estate or display area on a personal computer screen as part of the content for insertion of the ads, e.g., within the web page of the browser used to display the content. Additionally, the content publisher usually provides key content (and possibly user) data to ensure good targeting of the ads. Targeting of ads involves the gathering and tracking of personal user information and browsing behavior of particular searchers with which advertising is custom-fit to those particular people.

However, the service of ads to mobile devices varies in significant ways. Given the small size of most mobile device screens, there is limited space for the content to share with ads. This often results in unsatisfactory viewing experiences by searchers, which significantly diminishes advertising results for advertisers. For example, an advertiser may insert ads at the end of a short messaging service (SMS) message. SMS messages, however, have a fixed maximum length and this technique depends on adequate space, e.g., a certain number of characters, being left over for the ad to be inserted for display.

There also exists a lack of adequate context in the mobile devices advertising arena to improve targeting of ads to particular users. For example, an e-mail or SMS message may provide very little value for targeting to commercial ad categories. This is because every day messages are very personal and do not necessarily have a commercial context. In contrast, a web browser on a computer, for instance, has as one of its primary purposes the access by users to commercial information and purchasing opportunities. With cookies, internet protocol (I.P.) address resolution, the ability to track clicks, etc., the web browser of a personal computer is a useful tool for tracking commercial-related information of a user. These abilities are not integrated within a mobile device, and therefore, the ability to track a user's commercial-related behavior and interests is more difficult.

It is also known to stream advertisements through a client window displayed on a personal computer and to provide a user interface controls for interaction therewith. This client window is not fixed but is movable by the user to various positions within the computer's screen. The client window also is not integrated within a specific application, although interaction with the client window may cause a linking action that causes a web browser of the computer to go to a website of an advertiser.

SUMMARY

By way of introduction, the embodiments described below are drawn to mobile device application integration for inserting advertising, and more specifically, to mobile devices and related methods that integrate an ad position within an application of the mobile device for display of advertisements retrieved by those applications.

In a first aspect, a method is disclosed for delivering advertisements to mobile devices, including integrating an ad position within an application executable from a mobile device, wherein the ad position remains substantially constant in a location on a screen of the mobile device as viewed by a user throughout use of the application; including an ad call associated with the ad position; in response to executing the application, causing the ad call to retrieve an advertisement from an ad server; and receiving the advertisement into the ad position by the mobile device for display to the user.

In a second aspect, a method is disclosed for delivering advertisements to mobile devices, including integrating an ad position within an application executable from a mobile device, wherein the ad position remains substantially constant in a location on a screen of the mobile device as viewed by a user throughout use of the application; retrieving a plurality of ads from an ad server for display within the ad position; storing the plurality of ads in a storage of the mobile device; and rotatably inserting the plurality of ads in the ad position during use of the application.

In a third aspect, a system is disclosed for receiving advertisements, including a screen for displaying a plurality of applications together with advertisements to a user. A processor executes the plurality of applications of the mobile device. A storage stores the advertisements and program code that executes the plurality of applications. An ad position for displaying the advertisements is integrated into the program code of at least one of the plurality of applications executable by the processor such that the ad position remains substantially constant in a location on the screen as viewed by the user throughout use of the at least one application.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

In the following description, numerous specific details of programming, software modules, user selections, network transactions, database queries, database structures, etc., are provided for a thorough understanding of various embodiments of the systems and methods disclosed herein. However, the disclosed system and methods can be practiced with other methods, components, materials, etc., or can be practiced without one or more of the specific details. In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations.

The order of the steps or actions of the methods described in connection with the disclosed embodiments may be changed as would be apparent to those skilled in the art. Thus, any order appearing in the Figures, such as in flow charts or in the Detailed Description is for illustrative purposes only and is not meant to imply a required order.

Several aspects of the embodiments described are illustrated as software modules or components. As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc. that performs one or more tasks or implements particular abstract data types.

In certain embodiments, a particular software module may include disparate instructions stored in different locations of a memory device, which together implement the described functionality of the module. Indeed, a module may include a single instruction or many instructions, and it may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Figure 1:
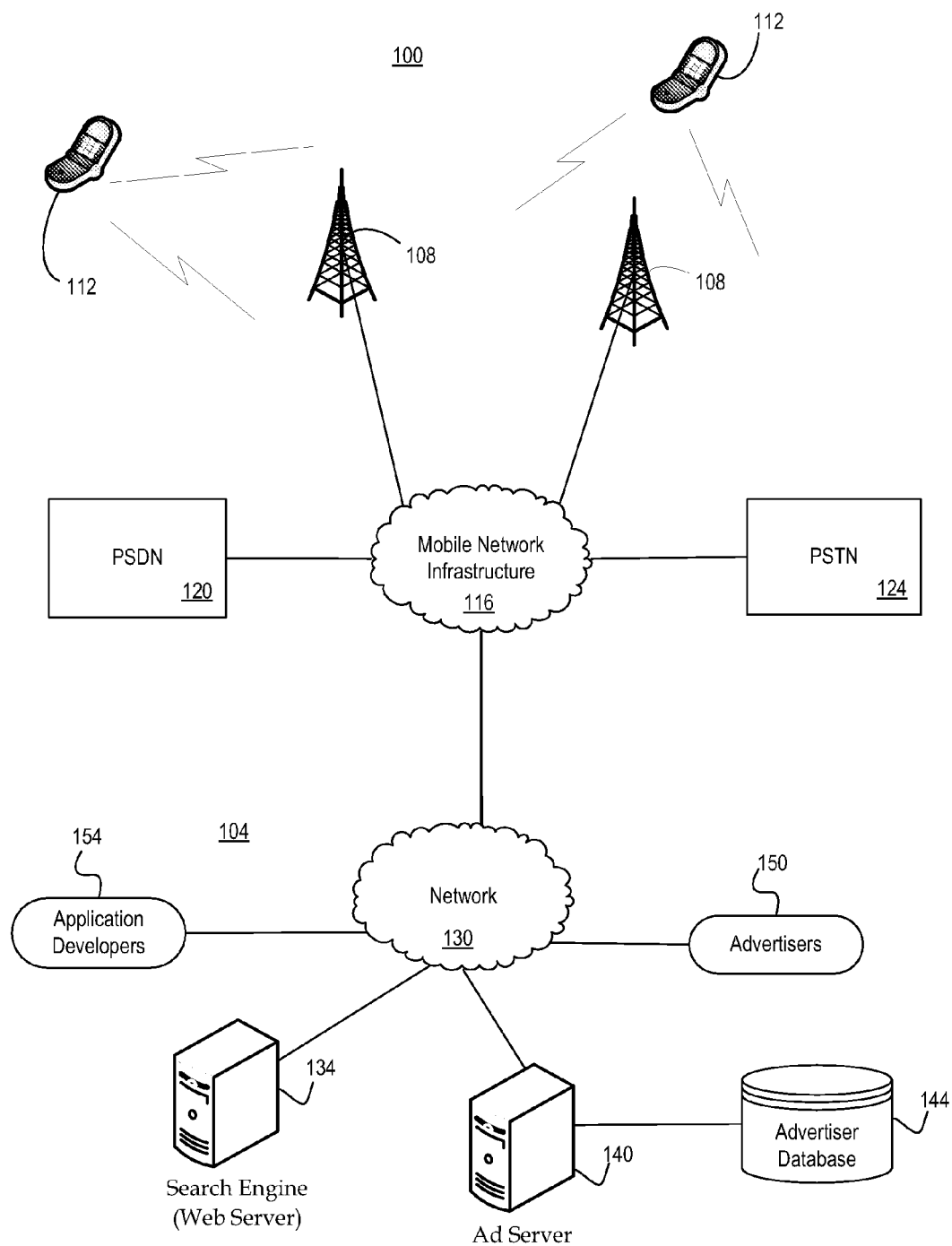
FIG. 1 illustrates a system diagram of a wireless cellular network as interconnected with an advertisement serving network.

FIG. 1 illustrates a system diagram of a wireless cellular network 100 as interconnected with an advertisement serving network 104. The wireless cellular network 100 includes a plurality of cellular towers 108 through which a plurality of mobile devices 112 gain access to a mobile network infrastructure 116 that provides, in addition to linkage to other mobile devices 112, the proper routing for delivery of content, including advertisements, to the mobile devices 112. The wireless cellular network 100 additionally includes a public switched data network (PSDN) 120 and a public switched telephone network (PSTN) 124. Each respective cellular tower 108 provides radio communication for mobile devices 112 in a geographic area served by the respective cellular tower 108. Mobility is provided for the mobile devices 112 by handing off radio communication from one cellular tower 108 to another as the mobile devices move through an area.

The mobile network infrastructure 116, the PSDN 120, and the PSTN 124 all may communicate through another network 130 such as the internet, the World Wide Web, a local area network (LAN), a wide area network (WAN), and/or through an extranet. The mobile network infrastructure 116 and the network 130 may include some levels of integration between the two, and therefore, that each is separately labeled is for clarity of discussion only. The ad serving network 104 may include the network 130, and accessible therethrough, a search engine (or Web server) 134, an ad server 140 including an advertiser database 144, and a plurality of advertisers 150 and mobile application developers 154.

The advertiser database 144 is for storing advertisements ("ads") and advertiser-related administrative information. The ads are deliverable over the network 130 by the ad server 140 to web pages or other applications executable from personal computing devices, including the mobile devices 112 of interest in this disclosure. Ads include text, graphics and other information and data provided by an advertiser 150 for presentation to a user of a mobile device such as mobile device 112. As previously noted, ads served to a web page or browser of a mobile device 112 are limited in regards to space, dimension, etc., where such ads will oftentimes not be viewable or of such poor quality as to not have the desired marketing affect sought for by an advertiser 150. As will be discussed, one or more ads served by the ad server 140 may be stored locally by a mobile device 112 for insertion, on a rotating basis, into the applications executed thereon. Additionally, the advertisers 150 may submit ads that they want served to applications on mobile devices 112 to the ad server 140, which may be owned or operated by an online service provider (OSP) such as Yahoo! of Sunnyvale, Calif. or Google of Mountain View, Calif. that also act as advertisement brokerages.

There are several popular applications available for current mobile devices or to be available in the future for future mobile devices, which include voice applications such as address book, dialer, and voicemail, and data applications such as browsers, short message service (SMS), e-mail, games, map navigation, etc. There are many sources to these applications, some of which include: (1) chip set and operating system vendors such as Qualcomm® that provide applications integrated within their operating system stack; (2) original equipment (or device) manufactures (OEM) may add or replace applications with their own branded applications; (3) mobile carriers may provide applications that are pre-installed or downloadable; and (4) the developer community may author additional applications. All of these sources of applications are jointly referred to herein as application developers 154.

Figure 2:
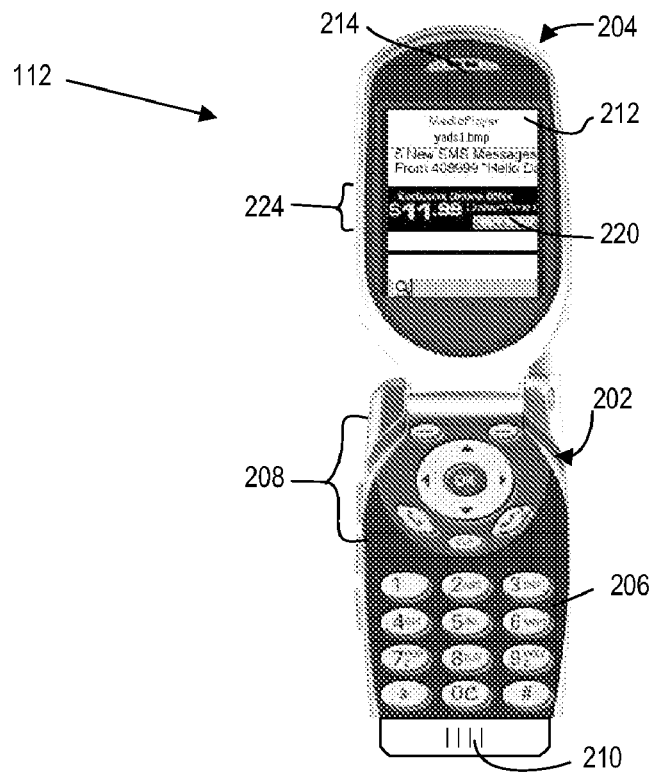
FIG. 2 illustrates an exemplary mobile device depicting an advertisement ("ad") position integrated within a substantially fixed screen location of an application executed thereon.

FIG. 2 is a mobile device 112 suitable for use in conjunction with the wireless cellular network 100 of FIG. 1. The mobile device 112 includes a first body portion 202 and a second body portion 204. The first body portion 202 includes a keypad 206 and other buttons 208 and a microphone 210. The second body portion 204 is attached by a hinge to the first body portion 202 and includes a display screen 212 and a speaker 214. The keypad 206, buttons 208, microphone 210, display 212, and speaker 214 together form a user interface for controlling the mobile device 112 by a user. The physical embodiment of the mobile device 112 is intended to be illustrative only. A wide variety of devices may be used to provide the functionality described herein for a mobile device such as mobile device 112.

The display screen 212 includes a plurality of areas in which text, graphics and other information may be displayed. These areas may typically be defined by software or other applications operating on the mobile device 112. As discussed, such applications include web browsers, short message service (SMS), games, e-mail, and even other non-content applications such as address books, calendars, and dialer screens. The screen 212 of the mobile device 112 displays the application as directed by software code stored in the mobile device 112 for execution of the same. Applications are designed to be executed on certain types of mobile devices 112 where original equipment manufactures (OEMs) of the devices 112 may need to work with the application developers 154 to ensure that the application as executed fits within the viewable screen 212 area, which is much smaller than a typically computer screen.

The exemplary embodiment of FIG. 2 illustrates an advertisement ("ad") position 220 integrated within a substantially fixed screen location 224 on the display 212 when an application is executed thereon. The ad position 220 may be located in any region or regions of the display screen 212. In accordance with the present embodiments, the ad position 220 is directly integrated into applications that operate in conjunction with the mobile device 112.

Direct integration of a dedicated ad position 220 into specific applications, e.g., coded into the applications for execution on the mobile device 112, allows the ad position 220 to be reserved in advance. The ad position 220 may be integrated directly into the source code of the application. The location 224 on the screen 212 of the ad position 220 will then remain substantially fixed absent updates or changes to the application itself. Ad position integration within mobile applications prevents the need to custom fit different types of ads within varying available positions of a web page or other content delivered within the applications, thus making ad delivery as disclosed herein content independent. For example, the bottom one-fourth of an SMS application screen could be reserved for an ad. Dedicated ad positions 220 will result in much more predictable space availability for these ads, with fixed height and width dimensions, similar to ads served on a personal computer. Ad position integration will provide better value for advertisers, and also enable greater reach as ads can be inserted in the ad position 220 each time the application is in use, regardless of whether the content enables such a position 220 for an ad.

Note that the screen location 224 is shown as spanning vertically over a set of horizontally running pixel bands, but the screen location 224 may vary vertically and horizontally in any number of possible areas of the screen 212. For instance, the horizontally running pixel bands need not run the entire width of the screen 212. Such areas also need not be symmetrical.

Figure 3:
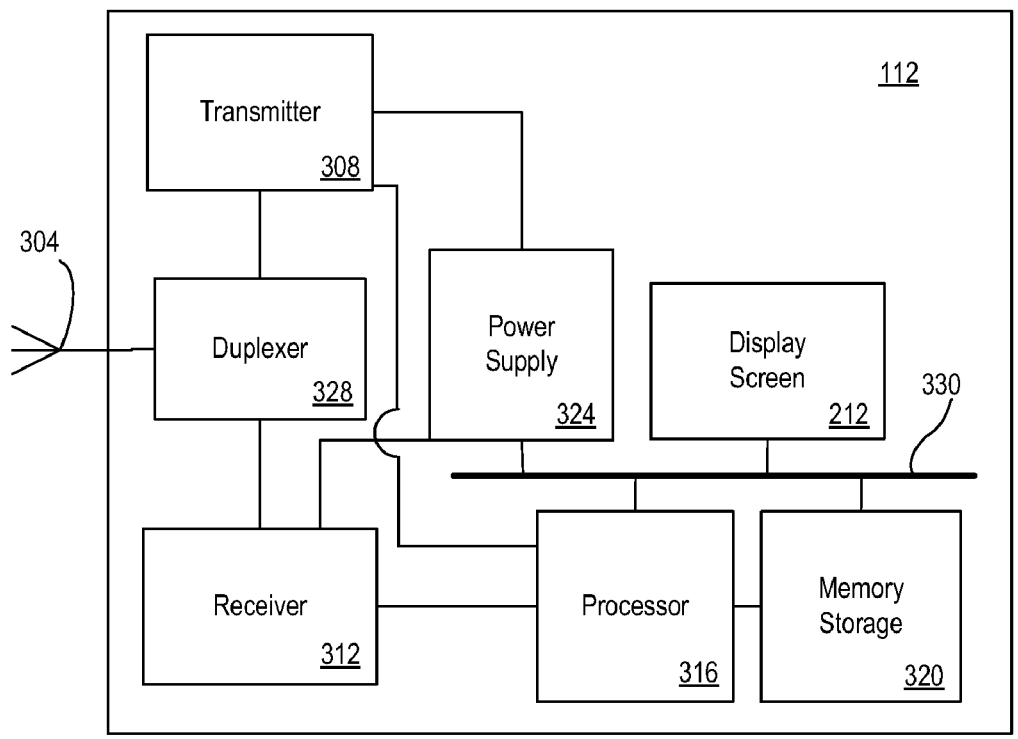
FIG. 3 illustrates a schematic block diagram depicting the inner hardware of a typical mobile device such as that displayed in FIG. 2.

FIG. 3 illustrates a block diagram depicting the inner hardware of a typical mobile device 112 such as that displayed in FIG. 2. The mobile device 112 includes the screen 212, an antenna 304, a transmitter 308, a receiver 312, a processor 316, a memory storage 320 ("storage"), a power supply 324, and a duplexer 328. In an exemplary embodiment, the antenna 304 may be coupled to both the transmitter 308 and the receiver 312, or the transmitter 308 and the receiver 312 may be connected to respective antenna units (not shown). In one embodiment, the duplexer 328 is coupled to both the transmitter 308 and to the receiver 312 to selectively switch between received and sent radio signals.

In another exemplary embodiment, the screen 212, the processor 316, the storage 320, and the power supply module 324 electrically communicate through a communications bus 330. The communications bus 330 is operable to transmit control and communications signals from and between the components connected to the bus 330, such as power regulation, memory access instructions, and other system information. In this embodiment, the processor 316 is coupled to the receiver 312 and to the transmitter 308.

The memory storage 320 stores the applications executed on the mobile device 112 in addition to the ads that may be stored locally for insertion in the ad position 220 created within the application. When the application is active, it will call for ads directly from the ad server 140, and display those ads in the area(s) reserved for ads, e.g., in the ad position 220. The logic for requesting for an ad, as well as the display of the ad, may be independent of the content within the application at any given time. For example, an SMS application could call for an ad whenever the user opens an SMS message. The screen 212 of the mobile device 112 (a cell phone) depicted in FIG. 2 illustrates a sample SMS application with dedicated content independent real estate, the ad position 220 located at the screen location 224, into which an ad has been delivered upon request and inserted by the SMS application.

In one embodiment, an advertising brokerage company collaborates with the application developers 154 of mobile device applications to create dedicated real estate for one or more ads therein. The application developers 154 may integrate an ad call into the application such that the application is enabled to make ad calls to the ad server 140 at various points in the user flow. The ad call retrieves one or more ads from the ad server 140 and stores them in the memory storage 320. When the application is executed, the ad call is then executed to either (or variably) pull an ad from the memory storage 320 or directly from the ad server 140 over the network 116, 130. The ad call pulls ads from these various locations and during intermittent or periodic moments during use of the application as determined by the coded ad call within the ad position 220. When the requested ad is delivered, the mobile device 112 inserts the ad for display to a user within the ad position 220 as located in the substantially fixed screen location 224.

Figure 4:
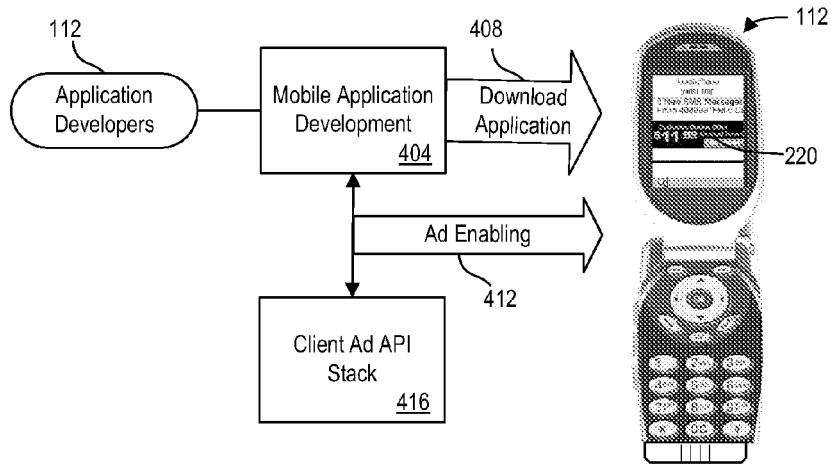
FIG. 4 illustrates a method in which the mobile device of FIG. 2 is initiated for reception of advertising into the ad position.

FIG. 4 illustrates a method in which the mobile device 112 of FIG. 2 is initiated for reception of advertising to the ad position 220. At step 404, a mobile application developer 154, such as an OEM, prepares an application (such as an SMS application) by integrating therein the ad position code. This ad position 220 may be an application programming interface (API) piece of code that is added within the application source code to act as an ad call when the application is executed. At step 408, once the ad position 220 is integrated within the application, the application developer 154 downloads, or caused to be downloaded, the application into the mobile device 112 for execution therein, either over the air or as a pre-load directly into the mobile device 112. At step 412, the application is ad-enabled so that ad service is provided to the mobile device 112. Ad service takes place through a client advertisement application programming interface (API) stack 416 of the ad server 140. When the API of the application loaded on the mobile device 112 is executed, a call is sent to the client API stack 416, which executes a related stack of code that will deliver the ad.

Figure 5:
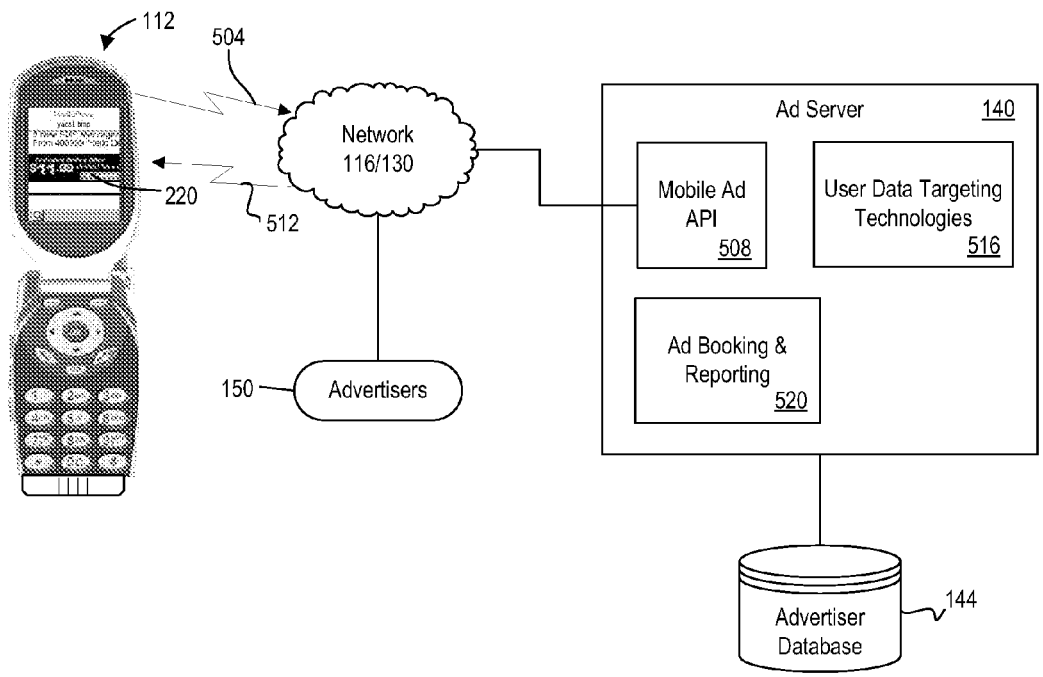
FIG. 5 illustrates a system for serving ads to the mobile device of FIG. 2, which includes employment of user data targeting technologies.

FIG. 5 illustrates a system for serving ads to the mobile device 112 of FIG. 2. The system includes a mobile device 112, a network 116, 130, an ad server 140 and ad database 144. Through a communication link 504 and over the network 116, 130, the mobile device 112 may submit an extensible markup language (XML) ad request to a mobile ad API 508, which is a part of the ad server 140 used for communicating with mobile devices 112. In return, over the network 116, 130 and through a communication link 512, the mobile ad API 508 returns one or more ads per the ad request of the mobile device 112. The processor 316 (FIG. 3) may execute the application and ad calls stored in the memory storage 320 so that the transmitter 308 transmits the communication link 504 and so that the receiver 312 receives the communication link 512. In addition to insertion of one of the received ads in the ad position 220, the mobile device 112 may also store in the memory storage 320 a plurality of received ads for rotatable insertion in the ad position 220 during the use of the application that made the ad call. When the ad server 140 sends the one or more ads as requested by the ad call of the ad position 220, the ad server 140 selects an ad format, to include size, resolution, number of colors, etc., to best match the screen size and capabilities of the mobile device 112. This ad format will relate to the size and dimensions, etc., of the ad position 220 found at the fixed screen location 224 of the screen 212.

When another ad call is executed, either after a predetermined period of time of use of the application or upon execution of another application, a new plurality of ads may be fetched from the ad server 140 by the mobile device 112. These newly received ads may be stored in the memory storage 320 as a replacement or an augmentation to those previously stored therein.

The ad server 140 may include a user data targeting technologies module 516 to carry out analysis on information received and/or stored in the ad server 140 so that the ad server 140 may send to the mobile device 112 targeted advertising as related to the particular user of the mobile device 112. This information may include information related to the user's interests and behavior. For instance, the information needed for such targeting of particular users may be obtained as they interact through various applications of the mobile device 112 with those of the ad brokerage company, in addition to interaction with related applications and services whether accessed through the mobile device 112 or other computing devices such as a personal computer.

As long as the ad brokerage company knows the particular user with which it interacts over the network 116, 130, useful targeting information may be collected and eventually used by the user data targeting technologies module 516 to send targeted advertising to the mobile device 112 of a particular user. For instance, the SMS application shown in the mobile device 112 of FIG. 2 could make a request for an ad whenever the user opens an SMS message. The request could carry additional information that would help better target the ad for the user. The information could include a user's location, a model of the mobile device 112 being used by the user, and content being seen by the user. While such content is not needed for service of the ads to the ad position 220, it may be useful for purpose of ad targeting. The ad server 140 may also include an ad booking and reporting module 520 for handling the ad campaigns of the advertisers 154, and for interaction with the same in terms of sending reports.

Figure 6:
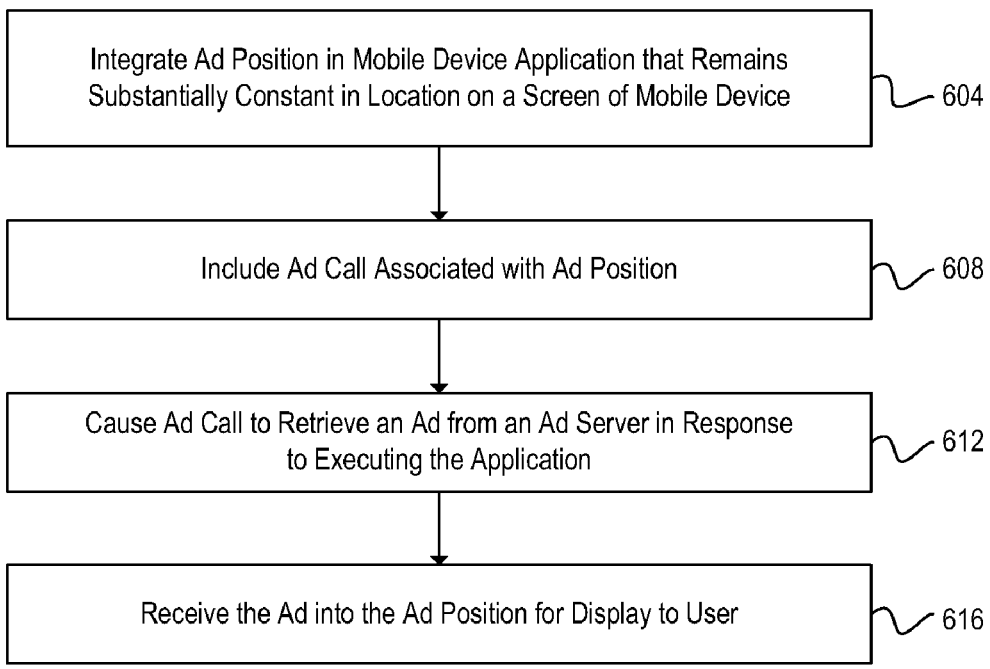
FIG. 6 is a flow chart of an exemplary method for delivering advertisements to mobile devices.

FIG. 6 is a flow chart of an exemplary method for delivering advertisements to mobile devices 112. At block 604, an ad position 220 is integrated within an application executable from a mobile device 112, wherein the ad position 220 remains substantially constant in a location 224 on a screen 212 of the mobile device 112 as viewed by a user throughout use of the application. At block 608, an ad call is included with the ad position 220. At block 612, the ad call is caused to retrieve an advertisement from an ad server 140 in response to execution of the application. At block 616, the advertisement is received into the ad position 220 by the mobile device 112 for display to the user.

Figure 7:
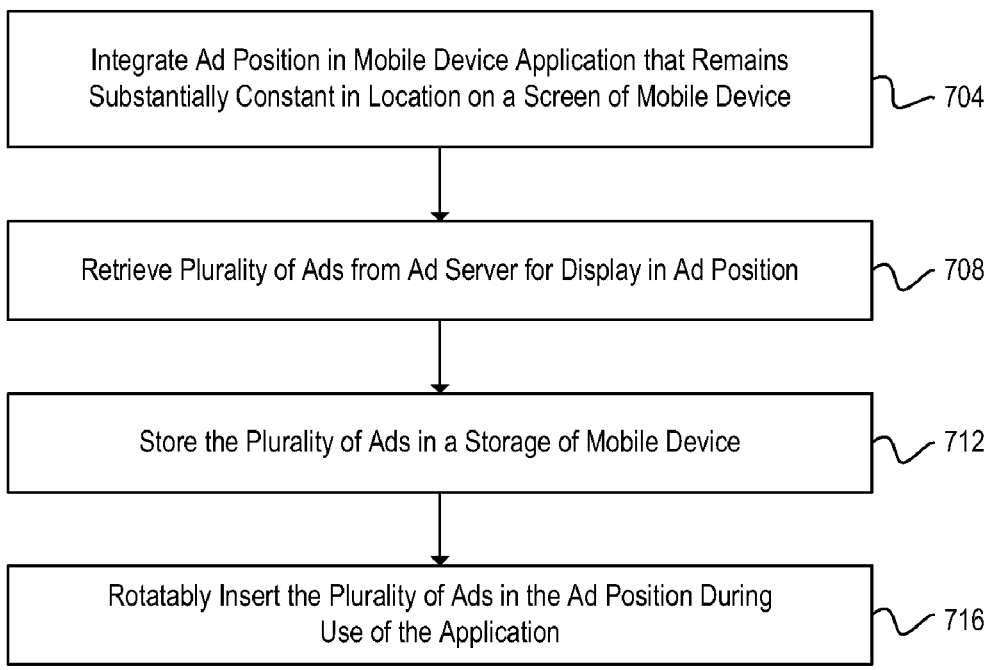
FIG. 7 is a flow chart of another embodiment of the method of FIG. 6.

FIG. 7 is a flow chart of another embodiment of the method of FIG. 6. At block 704, an ad position 220 is integrated within an application executable from a mobile device 112, wherein the ad position 220 remains substantially constant in a location 224 on a screen 212 of the mobile device 112 as viewed by a user throughout use of the application. At block 708, a plurality of advertisements are retrieved from an ad server 140 for display within the ad position 220. At block 712, the plurality of ads are stored in a storage 320 of the mobile device 112. At block 716, the plurality of ads are rotatably inserted in the ad position 220 during use of the application.

Various modifications, changes, and variations apparent to those of skill in the art may be made in the arrangement, operation, and details of the methods and systems disclosed. The embodiments may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware. Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

The invention claimed is:

1. A method for delivering advertisements to mobile devices, the method comprising:
    integrating an ad position within an application executable from a mobile device having a small screen, wherein the ad position remains in a fixed location on the screen of the mobile device as viewed by a user throughout use of the application, the ad position being of a fixed height and a fixed width in dimension;
    including an ad call associated with the ad position;
    in response to executing the application, causing the ad call to retrieve an advertisement from an ad server, wherein causing the ad call to retrieve an advertisement includes providing additional information that enables the ad server to provide a targeted advertisement in response to the ad call retrieve operation; and
    receiving the advertisement into the ad position by the mobile device for display to the user, wherein causing the ad call to retrieve and display the advertisement is executed independent of content of the application.

2. The method of claim 1, wherein integrating an ad position within the application comprises modifying the source code of the application to code the ad position as a viewable portion of the screen when the application is executed.

3. The method of claim 1, wherein the application comprises at least one of a short message service (SMS) application, a calendar, a game, an address book, an electronic mail application, a dialer and voicemail, or a map navigation application.

4. The method of claim 1, further comprising the ad call:
    retrieving a new advertisement periodically throughout the use of the application by the user.

5. The method of claim 1, wherein causing the ad call to retrieve an advertisement from the ad server further comprises retrieving a plurality of advertisements to be stored in a storage of the mobile device, wherein one of the plurality of advertisements is displayed to the user from within the ad position.

6. The method of claim 5, further comprising:
displaying another one of the plurality of stored advertisements during a period of use of the application.

7. The method of claim 6, further comprising the ad call:
retrieving a second plurality of advertisements to replace or augment the plurality of stored advertisements.

8. The method of claim 1, wherein the received advertisement comprises a targeted advertisement based on a user behavior or interest.

9. The method of claim 8, wherein the behavior or interest of the user is tracked through gathering information regarding the interaction of applications of the mobile device with a plurality of external applications.

10. A method for delivering advertisements to mobile devices, the method comprising:
integrating an ad position within an application executable from a mobile device, wherein the ad position remains in a fixed location on a screen of the mobile device as viewed by a user throughout use of the application, the ad position having fixed height and width dimensions within the screen in the fixed location unless changed through an update to the application;
retrieving a plurality of ads from an ad server for display within the ad position;
integrating an ad call within the ad position of the application;
in response to executing the application, causing the ad call to retrieve the plurality of advertisements from the ad server comprising providing additional information that enables the ad server to provide a targeted advertisement in response to the ad call;
storing the plurality of ads in a storage of the mobile device;
rotatably inserting the plurality of ads in the ad position during use of the application for display to the user;
integrating a second ad position different than the ad position within a second application executable from the mobile device, wherein the second ad position remains constant in a second fixed location on a screen of the mobile device as viewed by a user throughout use of the second application;
retrieving a second plurality of ads from the ad server for display in the second position that are different from the plurality of ads for display within the ad position; storing the second plurality of ads in the storage; and
rotatably inserting the second plurality of ads in the second ad position during use of the second application.

11. A mobile device for receiving advertisements, comprising:
a small screen for displaying a plurality of applications together with advertisements to a user on the mobile device;
a processor to execute the plurality of applications of the mobile device; and
a storage to store the advertisements and program code that executes the plurality of applications; wherein an ad position for displaying the advertisements is integrated into the program code of at least one of the plurality of applications executable by the processor such that the ad position remains in a fixed location on the screen as viewed by the user throughout use of the at least one application, the ad position being of a fixed height and a fixed width in dimension within the fixed location; and
an ad call integrated in the program code associated with the ad position, wherein in response to executing the at least one application, the processor retrieves an advertisement from the storage to be displayed in the ad position comprising sending additional information to the ad server to enable the ad server to provide a targeted ad in response to the retrieve operation, and wherein the ad call is executed to retrieve and display the advertisement independent of content of the application.

12. The mobile device of claim 11, wherein the program code comprises source code.

13. The mobile device of claim 11, wherein the processor retrieves a plurality of advertisements from an ad server, the plurality of advertisements being stored in the storage for display within the ad position.

14. The mobile device of claim 13, wherein the program code causes display of the plurality of stored advertisements within the ad position to be rotated during use of the application by the user.

15. The mobile device of claim 13, wherein the processor retrieves a second plurality of advertisements from the ad server to replace or augment the plurality of stored advertisements.

16. The mobile device of claim 11, wherein the retrieved advertisement comprises a targeted advertisement based on a user behavior or interest.

17. The mobile device of claim 16, wherein the behavior or interest of the user is tracked through gathering information regarding the interaction of the plurality of applications of the mobile device with a plurality of external applications.

* * * * *

UNITED STATES PATENT AND TRADEMARK OFFICE
CERTIFICATE OF CORRECTION

PATENT NO.       : 8,275,419 B2               Page 1 of 1
APPLICATION NO.  : 11/939685
DATED            : September 25, 2012
INVENTOR(S)      : Sundaresan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 752 days.

Signed and Sealed this
Ninth Day of September, 2014

Michelle K. Lee
*Deputy Director of the United States Patent and Trademark Office*